United States Patent
Murao et al.

(10) Patent No.: US 9,294,681 B2
(45) Date of Patent: Mar. 22, 2016

(54) EXPOSURE CONTROL APPARATUS FOR VEHICLE-MOUNTED CAMERA

(75) Inventors: Toshikazu Murao, Okazaki (JP); Takayuki Kimura, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 704 days.

(21) Appl. No.: 13/329,695

(22) Filed: Dec. 19, 2011

(65) Prior Publication Data

US 2012/0162424 A1 Jun. 28, 2012

(30) Foreign Application Priority Data

Dec. 22, 2010 (JP) .................................. 2010-286290

(51) Int. Cl.
| | |
|---|---|
| H04N 7/18 | (2006.01) |
| H04N 5/77 | (2006.01) |
| H04N 9/80 | (2006.01) |
| H04N 5/235 | (2006.01) |
| G06K 9/20 | (2006.01) |
| G06K 9/00 | (2006.01) |

(52) U.S. Cl.
CPC .......... *H04N 5/2351* (2013.01); *G06K 9/00798* (2013.01); *G06K 9/2054* (2013.01)

(58) Field of Classification Search
USPC .................. 386/223–224, 239–248
See application file for complete search history.

(56) References Cited

U.S. PATENT DOCUMENTS

| | | | | |
|---|---|---|---|---|
| 7,289,154 B2* | 10/2007 | Gindele | ........................ | 348/364 |
| 7,839,272 B2* | 11/2010 | Saito | ............................. | 340/435 |
| 2007/0177050 A1* | 8/2007 | Xiao et al. | ..................... | 348/371 |
| 2008/0055412 A1* | 3/2008 | Tanaka | ........................... | 348/159 |
| 2009/0080794 A1 | 3/2009 | Amano | | |
| 2009/0251563 A1* | 10/2009 | Mochida et al. | ........... | 348/229.1 |
| 2012/0105675 A1* | 5/2012 | Quan et al. | ................. | 348/229.1 |

FOREIGN PATENT DOCUMENTS

| | | | | |
|---|---|---|---|---|
| JP | 06-253208 | | 9/1994 | |
| JP | 2001-211383 | * | 8/2001 | ............. H04N 5/235 |
| JP | 2005-167842 | * | 6/2005 | ............. H04N 5/235 |
| JP | 2007-028279 | | 2/2007 | |
| JP | 2009-077230 | | 4/2009 | |
| JP | 2009-147906 | * | 7/2009 | ............... H04N 7/18 |
| JP | 4433045 | | 1/2010 | |

OTHER PUBLICATIONS

Office Action issued Apr. 16, 2013 in corresponding Japanese Application No. 2010-286290 (with English translation).

* cited by examiner

*Primary Examiner* — Hung Dang
(74) *Attorney, Agent, or Firm* — Harness, Dickey & Pierce, P.L.C.

(57) ABSTRACT

The exposure control apparatus is for performing exposure control for a camera mounted on a vehicle in accordance with brightness of a recognition area set in an image ahead of the vehicle taken by the camera. The exposure control apparatus includes a measuring means for measuring brightness of a photometric area showing a landscape more distant from the vehicle than a landscape shown by the recognition area in each of images successively taken by the camera, a detection means for detecting brightness variation with time of the photometric area based on measurement results by the measuring means for images taken by the camera at different times, and a control means configured to predict a timing at which the brightness of the recognition area changes based on the brightness variation with time of the photometric area, and perform exposure control of the camera at the predicted timing.

20 Claims, 4 Drawing Sheets

PHOTOMETRIC AREA    BRIGHTNESS EXTRACTION LINE    RECOGNITION AREA

EXPOSURE CONTROL APPARATUS FOR VEHICLE-MOUNTED CAMERA

This application claims priority to Japanese Patent Application No. 2010-286290 filed on Dec. 22, 2010, the entire contents of which are hereby incorporated by reference.

BACKGROUND OF THE INVENTION

1. Field of the Invention

The present invention relates to an exposure control apparatus used in a vehicle-mounted camera for taking an image ahead of a vehicle.

2. Description of Related Art

There have been proposed various techniques for performing an image processing on images ahead of a vehicle taken by a vehicle-mounted camera to recognize a white line painted on a road or three-dimensional object such as a preceding vehicle, to thereby issue a warning, or perform vehicle running control based on the recognition results. To increase the accuracy of recognition of a white line or a three-dimensional object, it is a matter of great importance to properly perform exposure control of the vehicle-mounted camera in accordance with brightness of an area ahead of the vehicle. For example, as described in Japanese Patent Application Laid-open No. 2009-157085, it is known to set a part of an image taken by a vehicle-mounted camera as a recognition area for recognizing an object to be recognized, and control exposure of the vehicle-mounted camera in accordance with brightness of the recognition area.

However, since the brightness of the road surface ahead of the vehicle varies depending on various factors such as the light of the headlight of an oncoming vehicle, the shadow of the entrance of a tunnel, and the light at the exit of a tunnel, it may occur that it is impossible to perform the exposure control well following the variation of the brightness. To deal with this problem, there is known a method that reduces the exposure of a vehicle-mounted camera when it is detected that the signals of an image taken by the camera are saturated, as described, for example, in Japanese Patent Application Laid-open No. 2007-28279.

However, since this method adjusts the exposure after detecting saturation of the signals of a taken image, it has a problem in that the exposure control cannot be performed well following variation of the brightness, and accordingly the recognition accuracy is lowered immediately after the brightness has changed greatly.

SUMMARY

An exemplary embodiment provides an exposure control apparatus for performing exposure control for a camera mounted on a vehicle in accordance with brightness of a recognition area set in an image ahead of the vehicle taken by the camera comprising:

a measuring means for measuring brightness of a photometric area showing a landscape more distant from the vehicle than a landscape shown by the recognition area in each of images successively taken by the camera;

a detection means for detecting brightness variation with time of the photometric area based on measurement results by the measuring means for images taken by the camera at different times; and a control means configured to predict a timing at which the brightness of the recognition area changes based on the brightness variation with time of the photometric area detected by the detection means, and perform exposure control of the camera at the predicted timing.

According to the exemplary embodiment, it is possible to improve the followability of exposure control for a camera mounted on a vehicle to take images ahead of the vehicle with respect variation of brightness of a recognition area within each image taken by the camera.

Other advantages and features of the invention will become apparent from the following description including the drawings and claims.

PREFERRED EMBODIMENTS OF THE INVENTION

First Embodiment

Figure 1:
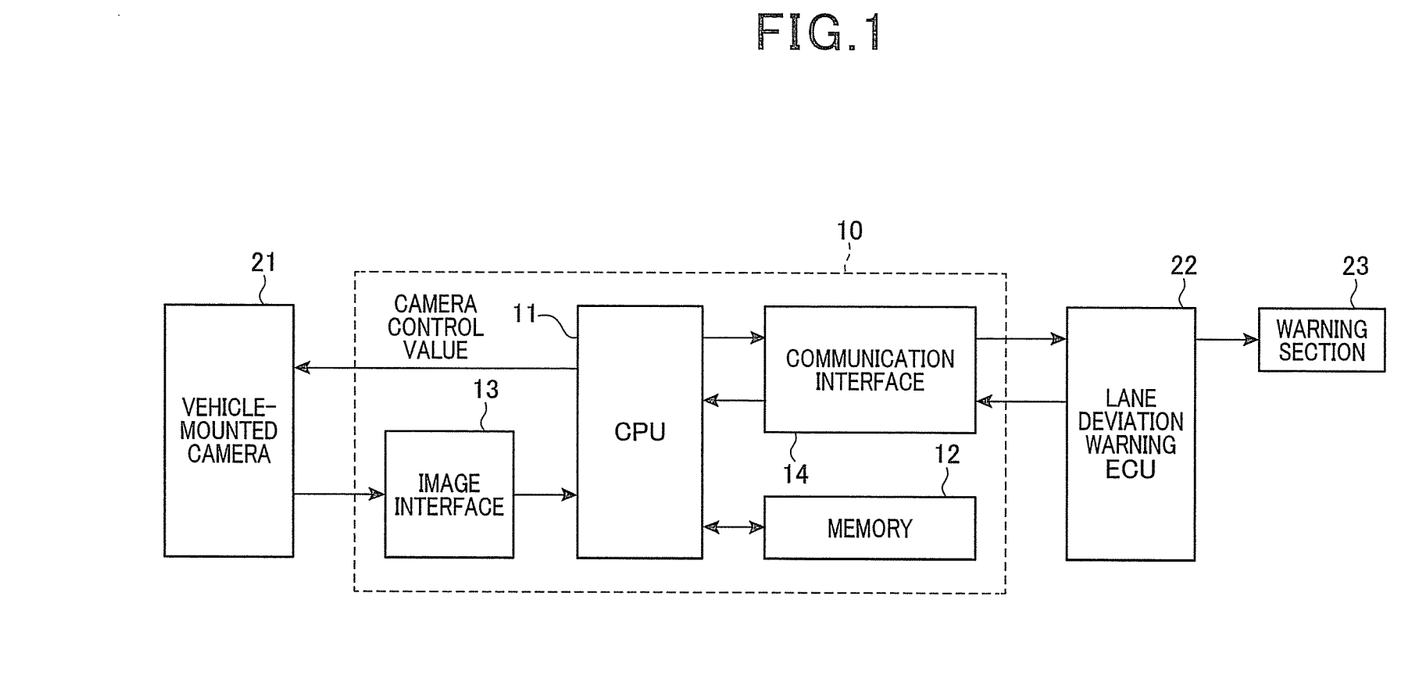
FIG. 1 is a block diagram showing the structure of an exposure control apparatus according to an embodiment of the invention.

FIG. 1 is a block diagram showing the structure of an exposure control apparatus 10 according to an embodiment of the invention.

The exposure control apparatus 10 is mounted on a vehicle together with a vehicle-mounted camera 21, a lane deviation warning ECU 22 and a warning section 23.

The exposure control apparatus 10 includes a CPU 11, a memory 12, an image interface 13 for receiving images taken by the camera 21 and a communication interface 14 for performing communication with the lane deviation warning ECU 22.

The camera 21 is located at a position inside the vehicle cabin, which is appropriate for taking an image of the road ahead of the vehicle, for example, on the back of a room mirror. The camera 21 is oriented such that its image area corresponds to a predetermined area ahead of the vehicle.

The camera 21 includes, in addition to a CCD image sensor or a CMOS sensor, an amplifier and an A/D converter. The amplifier and the A/D converter are for amplifying analog signals showing luminance of pixels of an image taken by the image sensor by a predetermined gain, and converting the amplified analog signals into digital pixel values. The camera 21 outputs the digital pixel values as image signals for each horizontal line for each image.

The image interface 13 is inputted with the digital pixel values and the horizontal and vertical sync signals outputted form the camera 21. The CPU 11 recognizes which of the vertical and horizontal pixel positions the pixel values outputted for each horizontal line correspond to, based on the horizontal and vertical sync signals. The pixel values are stored in the memory 12 while being associated with their pixel positions.

The CPU 11 process the image signals having been outputted from the camera 21 and stored in the memory 12 to recognize a recognition object (a white line painted on the road in this embodiment), and output a signal indicative of the position of a recognized white line to the lane deviation warning ECU 22. The CPU 11 also performs exposure control for the camera 21 such that contrast between the white line and other portions of the road surface becomes proper, to correctly recognize a white line. More specifically, the CPU 11 outputs, to the camera 21, camera control values including adjustment command values based on which the exposure time (shutter speed) and frame rate of the camera 21, and the gain of the amplifier are adjusted.

The communication interface 14 is for intermediating communication between the CPU 11 and the lane deviation warning ECU 22. In this embodiment, the CPU 11 outputs a signal indicative of the position a recognized white line in a taken image to the lane deviation warning ECU 22. The lane deviation warning ECU 22 determines whether there is possibility that the own vehicle (the vehicle on which the exposure control apparatus 10 is mounted) may deviate from the lane on which the own vehicle is running, and commands the warning section 23 to issue warning upon determining that there is possibility of lane deviation.

Figure 2:
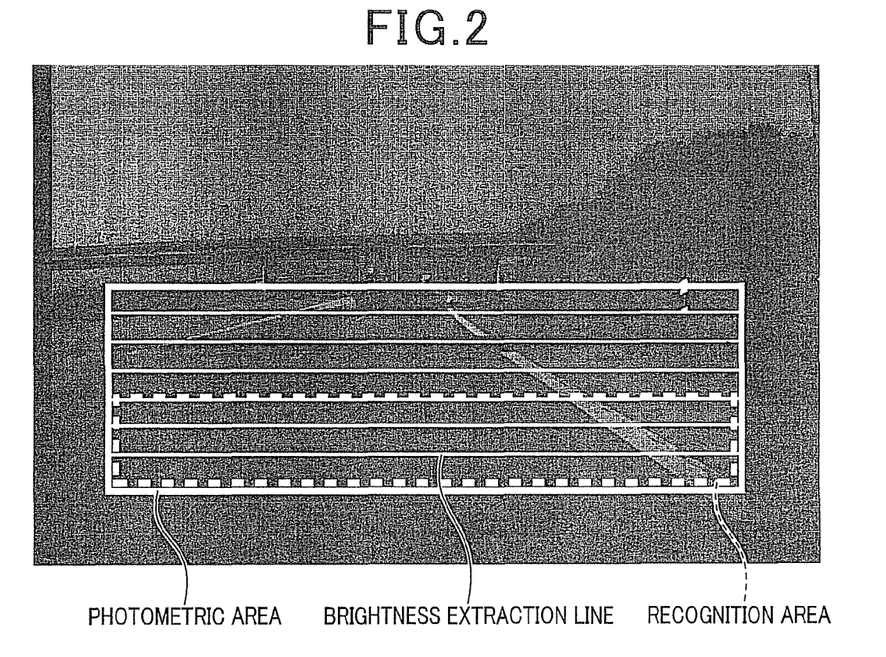
FIG. 2 is a diagram showing a recognition area, a photometry area, and brightness extraction lines set in a taken image.

Next, the exposure control performed in this embodiment is explained. As shown in FIG. 2, recognition of a white line is performed for a recognition area (the rectangular area surrounded by the dotted line) set in an image taken by the camera 21 so as to include a road landscape. Accordingly, according to this embodiment, the accuracy of the white line recognition can be improved by performing exposure control of the camera 21 in accordance with the brightness of the road surface within the recognition area. More specifically, in this embodiment, an area constituted of the recognition area, and an area expanded from the recognition area in the upward direction (an area located more distant from the own vehicle than the recognition area) and accordingly including a more distant road landscape is set as a photometric area (the area surrounded by the solid heavy line in FIG. 2). The upper edge of the photometric area is set to the position showing a distance from the own vehicle travelled by the own vehicle in one image-taking cycle when it is assumed that the own vehicle runs at an upper limit speed. The upper limit speed may be a predetermined fixed speed, or the speed limit of the road on which the own vehicle is running.

Figure 3:
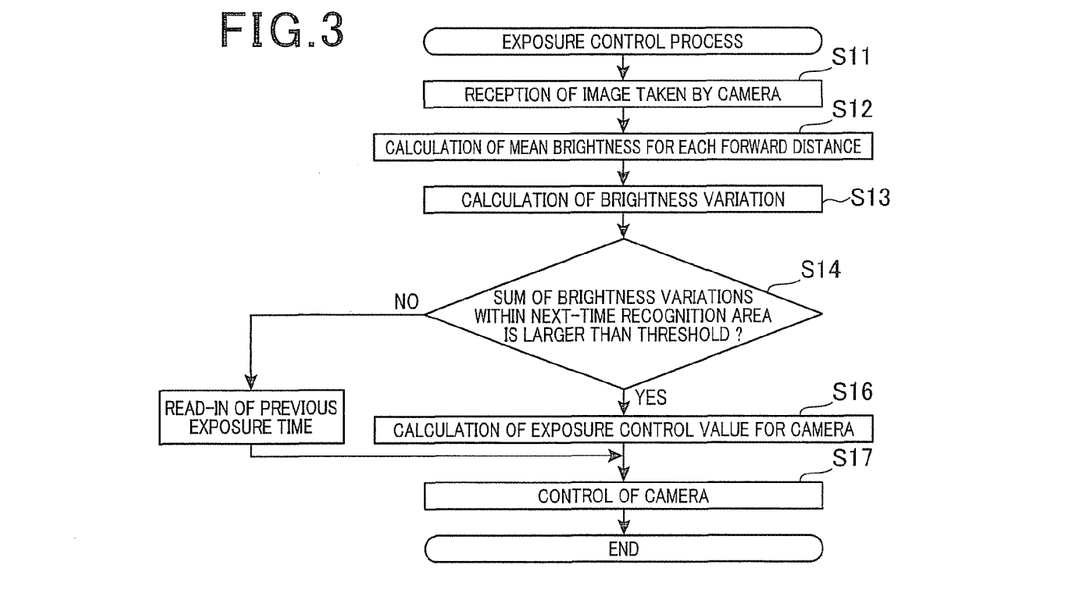
FIG. 3 is a flowchart showing exposure control process performed by the exposure control apparatus.

Next, the exposure control process which the CPU 11 performs at regular time intervals (every 100 ms, for example) in accordance with a restored program with reference to the flowchart of FIG. 3.

Figure 4A:
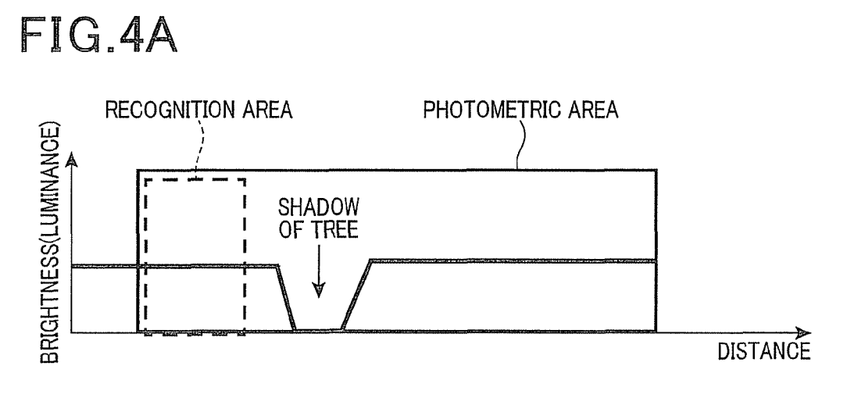
FIG. 4A is a graph showing an example of the brightness (luminance) of a road surface with the forward distance from the vehicle.

The process begin in step S11 where the CPU 11 takes in an image from the camera 21. In subsequent step S12, the brightness of the road surface is measured for several equidistant lines from the own vehicle within the photometric area of the image taken in step S11. More specifically, as shown in FIG. 2, all the pixels on each of the horizontal lines drawn at equidistant intervals within the photometric area (referred to as "brightness extraction lines" hereinafter) are extracted, and the average of the pixel values are calculated for each brightness extraction line. Accordingly, as shown in FIG. 4A, the brightness (luminance) of the road surface as a function of the distance from the own vehicle (may be referred to as "forward distance" hereinafter) can be obtained. For example, when the shadow of a tree alongside the road extends to a portion of the road surface ahead of the own vehicle, the brightness of the road surface becomes low at this portion.

Figure 4B:
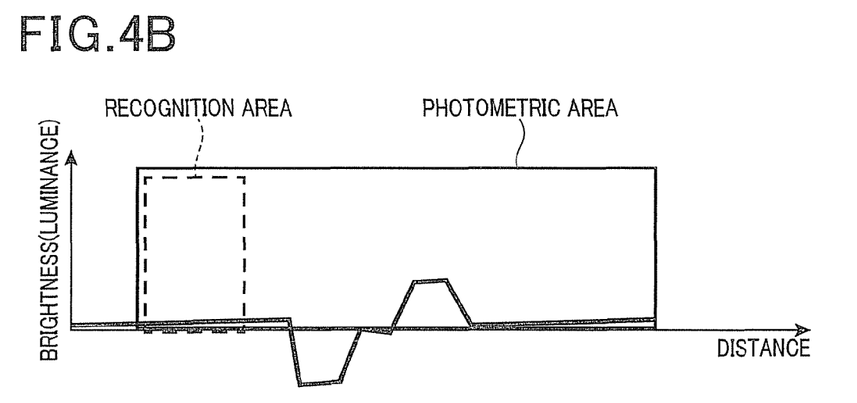
FIG. 4B is a graph showing an example of variation of the brightness (luminance variation) of a road surface with the forward distance from the vehicle.

In subsequent step S13, the difference between the brightness measured when an exposure control value was changed last time and the brightness measured this time in step S12 is calculated as brightness variation for each of the brightness extraction lines. As a result, as shown in FIG. 4B, the brightness variation (luminance variation) as a function of the forward distance is obtained. For example, since the shadow of the tree alongside the road comes closer as the own vehicle travels forward; the shadow is detected as a brightness varying object. Although the brightness variation is calculated as the difference between the brightness measured when the exposure control value was changed last time and the brightness measured this time for each of the forward distances (brightness extraction lines) in this embodiment, it may be calculated as the difference between the brightness measured in the previous cycle (previous frame) and the brightness measured in the current cycle.

Figure 4C:
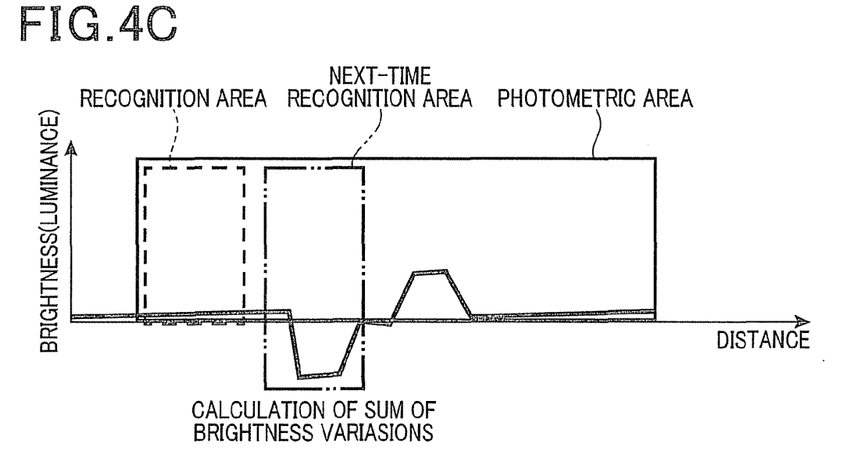
FIG. 4C is a graph showing an example of a next-time recognition area set in the graph shown in FIG. 4B; process.

In subsequent step S14, as shown in FIG. 4C, of the brightness variations for the respective forward distances calculated in step S13, the one which is expected to be included in a next-time recognition area assumed to be included in the recognition area in the next cycle (in the next frame) is determined and selected based on the speed of the own vehicle and the process cycle (100 ms in this embodiment). Subsequently, the sum of the brightness variations of the respective forward distances within this next-time recognition area is calculated. Next, it is determined whether or not the absolute value of the calculated sum of the brightness variations is larger than or equal to a predetermined determination threshold. That is, it is determined whether or not the brightness of the recognition area in an image taken by the camera 21 in the next cycle will change from the brightness of the recognition area in the current image. In other words, the timing at which the brightness of the recognition area substantially changes is estimated in step S14. In this embodiment, the determination threshold is set to a value larger than zero, so that a determination that the brightness will not change is made when the sum of the brightness variations is small. The reason why the sum of the brightness variations is compared with the determination threshold is to enable the camera 21 to take an image with an exposure appropriate for both the dark and bright parts of the image.

If the determination result in step S14 is negative, the process proceeds to step S15 to acquire the exposure time set in the previous cycle, and sets it as the exposure time for the current cycle. Thereafter, the process proceeds to step S17.

If the determination result in step S14 is affirmative, the process proceeds to step S16 to calculate the exposure time of the camera 21 for this cycle. More specifically, the brightness of the recognition area for the next cycle is estimated based on the mean brightness of the recognition area for the current cycle calculated in step S12. Subsequently, the exposure time of the camera 21 is determined and set based on the ratio between the measured brightness and a predetermined target brightness. Thereafter, the process proceeds to step S17.

In step S17, the exposure control of the camera 21 is performed in accordance with the exposure time set in step S15 or S16, and then this process is terminated. The above described embodiment provides the following advantages. According to the exposure control apparatus 10 of this embodiment, since it is possible to predict change of the brightness of the recognition area with the travel of the vehicle, the followability of the exposure control of the camera 21 to the brightness of the recognition area can be improved. Particularly, since a brightness variant on the road surface such as the shadow of a tree alongside the road that approaches to the own vehicle with the travel of the own vehicle is detected as a brightness varying object, while a brightness variant that does not change in the forward distance is not detected, it is possible to perform the exposure control more properly compared to the conventional case in which the brightness of the recognition area for the next cycle (next frame) is estimated only based on the brightness of the next-time recognition area.

Figure 5A:
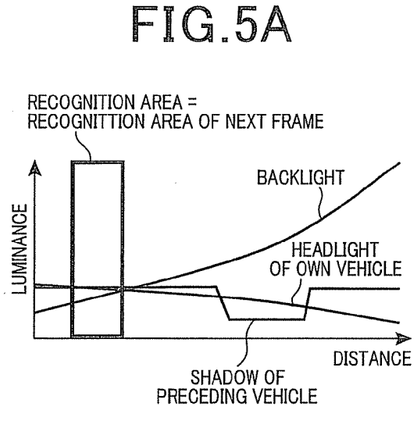
FIG. 5A is a graph showing an example of the case in which the forward distance of a brightness varying object does not change irrespective of travel of the own vehicle.
Figure 5B:
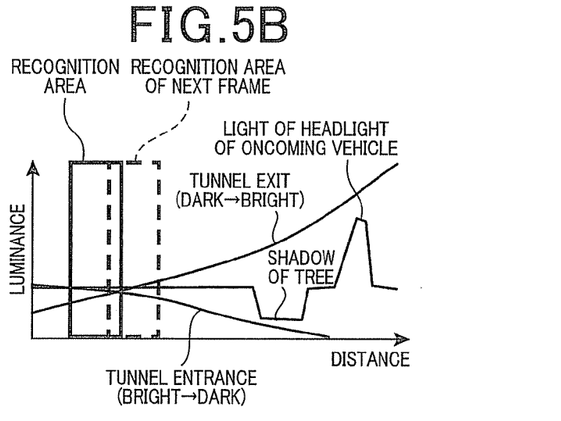
FIG. 5B is a graph showing an example of the case in which the forward distance of a brightness varying object becomes shorter with the travel of the own vehicle.

The condition of the road surface brightness is classified into two cases shown in FIG. 5A and FIG. 5B, respectively. FIG. 5A shows an example in which the forward distance of a brightness varying object does not change with the travel of the vehicle (that is, the relative position, of the recognition area set based on the brightness of the road surface does not change with the travel of the vehicle). FIG. 5B shows an example in which the forward distance of a brightness varying object becomes shorter with the travel of the vehicle (that is, the relative position of the recognition area is varied with the travel of the vehicle).

Figure 5C:
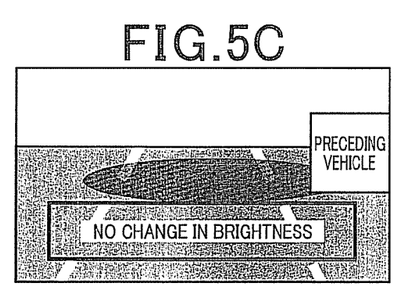
FIG. 5C is a diagram showing an example in which the shadow of a vehicle running diagonally in front of the own vehicle is on the road surface.
Figure 5D:
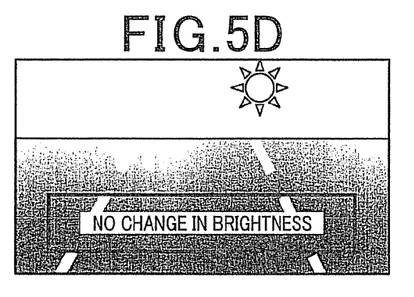
FIG. 5D is a diagram showing an example in which the back light illuminates the road surface.
Figure 5E:
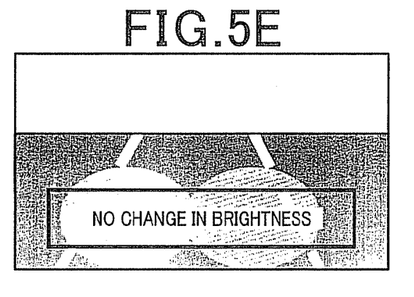
FIG. 5E is a diagram showing an example in which the light of the headlight of the own vehicle illuminates the road surface.

For example, the shadow of a vehicle running diagonally in front of the own vehicle as shown in FIG. 5C, the back light as shown in FIG. 5D, and the light of the headlight of the own vehicle as shown in FIG. 5E do not vary in the forward distance with the travel of the own vehicle. Accordingly, in these examples, although the next-time recognition area is dark, the recognition area of the next frame does not become dark.

Figure 5F:
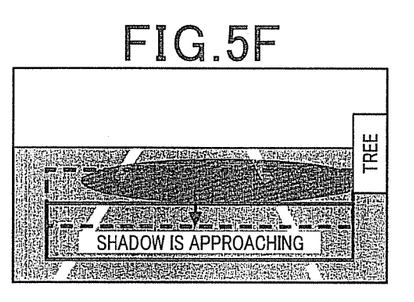
FIG. 5F is a diagram showing an example in which the shadow of a tree alongside the road is on the road surface.
Figure 5G:
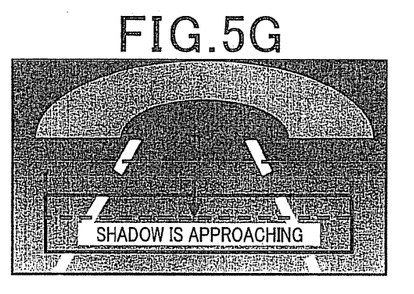
FIG. 5G is a diagram showing an example in which the shadow of the exit of a tunnel is on the road surface.
Figure 5H:
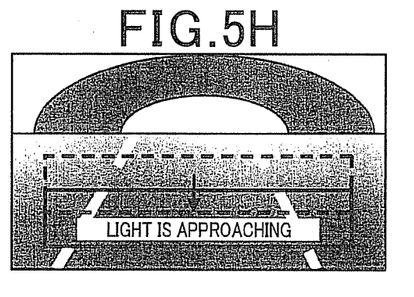
FIG. 5H is a diagram showing an example in which the light at the exit of a tunnel is on the road surface.

On the other hand, the forward distances of the shadow of an object such as a tree alongside the road as shown in FIG. 5F, the shadow of the entrance of a tunnel as shown in FIG. 5G, and the light at the exit of a tunnel as shown in FIG. 5H become shorter with the travel of the own vehicle. Accordingly, in these examples, when the next-time recognition area is dark, the recognition area of the next frame becomes dark.

As explained above, unlike the conventional exposure control apparatus configured to estimate the brightness of the recognition area of the next frame only based on the brightness of the next-time recognition area, the exposure control apparatus according to this embodiment is capable of distinguishing between the case in which the forward distance of a brightness varying object does not vary with the travel of the own vehicle and the case in which the forward distance of a brightness varying object varies with the travel of the own vehicle. Accordingly, according to the exposure control apparatus of this embodiment, it is possible to determine the exposure control value more properly than the conventional apparatus.

Further, according to this embodiment, since the process for calculating the exposure control value is not performed when it is determined that the brightness of the brightness recognition area will not vary, the process load can be reduced.

More specifically, since the process for calculating the exposure control value is not performed when it is determined that variation of the brightness of the recognition area is smaller than a predetermined threshold, it is possible to prevent that the exposure control value is unnecessarily calculated when the brightness of the recognition area varies hardly.

Further, since the exposure control value is calculated based on the brightness of the next-time recognition area when it is determined that the brightness of the recognition area will change at the time when the camera 21 takes an image next time, it is possible to perform the exposure control properly in accordance with the brightness of the recognition area of the next frame.

Further, since the average of brightnesses of the pixels is calculated for each brightness extraction line, is it possible to calculate the brightness for the respective forward distances properly.

Other Embodiments

It is a matter of course that various modifications can be made to the above embodiment as described below.

In the above embodiment, all the pixels on the brightness extraction line are extracted to calculate the average brightness. However, part of the pixels on the brightness line may be extracted to calculate the average brightness. The above embodiment may be modified such that the pixels on the left half and the pixels on the right half of the brightness extraction line are extracted to calculate the average brightnesses of the left half and the right half of the same brightness extraction line.

Instead of calculating the average value of the pixel values, the median value or mode value of the pixel values may be calculated.

The above explained preferred embodiments are exemplary of the invention of the present application which is described solely by the claims appended below. It should be understood that modifications of the preferred embodiments may be made as would occur to one of skill in the art.

What is claimed is:

1. An exposure control apparatus for performing exposure control for a camera mounted on a vehicle in accordance with brightness of a recognition area set in an image ahead of the vehicle taken by the camera, the exposure control apparatus comprising:

a measuring unit measuring brightness of a photometric area showing a landscape more distant from the vehicle than a landscape shown by the recognition area in each of images successively taken by the camera;

a detection unit detecting brightness variation with time of the photometric area based on measurement results by the measuring unit for images taken by the camera at different times; and a control unit configured to predict a timing at which the brightness of the recognition area changes based on the brightness variation with time of the photometric area detected by the detection unit, and perform exposure control of the camera at the predicted timing;

wherein the control unit is configured to estimate based on a speed of the vehicle, as a next-time recognition area, an image area assumed to be included in the recognition area of an image taken by the camera next time, and determine whether or not the brightness of the recognition area will change at the time when the camera takes an image next time based on brightness variation with time of the next-time recognition area detected by the detection unit;

wherein the detection unit is configured to detect an amount of brightness variation with time of the brightness of the next-time recognition area based on the measurement results by the measuring unit for images taken by the camera at different times, and the control unit is configured to determine whether or not the brightness of the recognition area will change at the time when the camera takes an image next time by comparing the amount of brightness variation with time of the next-time recognition area detected by the detection unit with a determination threshold;

wherein the control unit is configured to make a determination whether or not the brightness of the recognition area will change when the camera takes an image next time, calculate an exposure control value used to control exposure of the camera when the determination is affirmative, and set, as the exposure control value for the time when the camera takes an image next time, the exposure control value previously calculated when the determination is negative;

wherein the photometric area is an area in which the own vehicle is assumed to run at the next image-taking cycle, and wherein the brightness variation with time of the next-time recognition area is the difference between the brightness measured when an exposure control value was changed last time and the brightness measured this time.

2. The exposure control apparatus according to claim 1, wherein the control unit is configured to calculate the exposure control value to be used at a time when the camera takes an image next time based on the brightness of the next-time recognition area upon determining that the brightness of the recognition area will change at the time when the camera takes an image next time.

3. The exposure control apparatus according to claim 1, wherein the photometric area includes the recognition area and the landscape more distant from the vehicle than the landscape shown by the recognition area.

4. The exposure control apparatus according to claim 1, wherein the measuring unit is configured to measure brightness of each of predetermined parts of the photometric area corresponding to different forward distances from the vehicle, the detection unit is configured to detect brightness variation with time of each of the predetermined parts of the photometric area based on measurement results by the measuring unit, and the control section is configured to predict the timing at which the brightness of the recognition area changes based on the brightness variations with time of the predetermined parts detected by the detection unit.

5. The exposure control apparatus according to claim 4, wherein the predetermined parts of the photometric parts have shapes of parallel horizontal lines, and the measuring unit is configured to measure a mean value of brightnesses of pixels present on each of the horizontal lines as brightness of each of the forward distances.

6. The exposure control apparatus according to claim 1, wherein the photometric area is a single area located within the image ahead within which both the landscape and the recognition area separate from the landscape are located.

7. The exposure control apparatus according to claim 6, wherein the photometric area is less than a total area of the image ahead.

8. The exposure control apparatus according to claim 6, wherein an upper edge of the photometric area is determined based upon an upper limit speed of the vehicle.

9. The exposure control apparatus according to claim 6, wherein the landscape is located at an upper side of the photometric area and the recognition area is located at a lower side of the photometric area directly below the landscape.

10. The exposure control apparatus according to claim 9, wherein the recognition area and the landscape encompasses the entire photometric area.

11. An exposure control apparatus comprising:

a camera mounted on a vehicle, the exposure control apparatus performing exposure control for the camera in accordance with brightness of a recognition area set in a first portion of an image ahead of the vehicle taken by the camera;

a measuring unit measuring brightness of a photometric area set in a second portion of the image ahead of the vehicle taken by the camera different than the first portion, the photometric area showing a landscape more distant from the vehicle than a landscape shown by the recognition area in each of a plurality of images successively taken by the camera;

a detection unit detecting brightness variation with time of the photometric area based on measurement results by the measuring unit for images taken by the camera at different times; and a control unit configured to predict a timing at which the brightness of the recognition area changes based on the brightness variation with time of the photometric area detected by the detection unit, and perform exposure control of the camera at the predicted timing;

wherein the control unit is configured to estimate based on a speed of the vehicle, as a next-time recognition area, an image area assumed to be included in the recognition area of an image taken by the camera next time, and determine whether or not the brightness of the recognition area will change at the time when the camera takes an image next time based on brightness variation with time of the next-time recognition area detected by the detection unit;

wherein the detection unit is configured to detect an amount of brightness variation with time of the brightness of the next-time recognition area based on the measurement results by the measuring unit for images taken by the camera at different times, and the control unit is configured to determine whether or not the brightness of the recognition area will change at the time when the camera takes an image next time by comparing the amount of brightness variation with time of the next-time recognition area detected by the detection unit with a determination threshold;

wherein the control unit is configured to make a determination whether or not the brightness of the recognition area will change when the camera takes an image next time, calculate an exposure control value used to control exposure of the camera when the determination is affirmative, and set, as the exposure control value for the time when the camera takes an image next time, the exposure control value previously calculated when the determination is negative;

wherein the photometric area is an area in which the own vehicle is assumed to run at the next image-taking cycle, and wherein the brightness variation with time of the next-time recognition area is the difference between the brightness measured when an exposure control value was changed last time and the brightness measured this time.

12. The exposure control apparatus according to claim 11, wherein the photometric area includes the recognition area and the landscape more distant from the vehicle than the landscape shown by the recognition area.

13. The exposure control apparatus according to claim 11, wherein the control unit is configured to calculate the exposure control value to be used at a time when the camera takes an image next time based on the brightness of the next-time recognition area upon determining that the brightness of the recognition area will change at the time when the camera takes an image next time.

14. The exposure control apparatus according to claim 11, wherein the measuring unit is configured to measure brightness of each of predetermined parts of the photometric area corresponding to different forward distances from the vehicle, the detection unit is configured to detect brightness variation with time of each of the predetermined parts of the photometric area based on measurement results by the measuring unit, and the control section is configured to predict the timing at which the brightness of the recognition area changes based on the brightness variations with time of the predetermined parts detected by the detection unit.

15. The exposure control apparatus according to claim 14, wherein the predetermined parts of the photometric parts have shapes of parallel horizontal lines, and the measuring unit is configured to measure a mean value of brightnesses of pixels present on each of the horizontal lines as brightness of each of the forward distances.

16. The exposure control apparatus according to claim 11, wherein the photometric area is a single area located within the image ahead within which both the landscape and the recognition area separate from the landscape are located.

17. The exposure control apparatus according to claim 16, wherein the photometric area is less than a total area of the image ahead.

18. The exposure control apparatus according to claim 16, wherein an upper edge of the photometric area is determined based upon an upper limit speed of the vehicle.

19. The exposure control apparatus according to claim 16, wherein the landscape is located at an upper side of the photometric area and the recognition area is located at a lower side of the photometric area directly below the landscape.

20. The exposure control apparatus according to claim 19, wherein the recognition area and the landscape encompasses the entire photometric area.

* * * * *

UNITED STATES PATENT AND TRADEMARK OFFICE
CERTIFICATE OF CORRECTION

PATENT NO. : 9,294,681 B2
APPLICATION NO. : 13/329695
DATED : March 22, 2016
INVENTOR(S) : Toshikazu Murao et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this
Fourteenth Day of June, 2016

Michelle K. Lee
*Director of the United States Patent and Trademark Office*